United States Patent
Baker et al.

(10) Patent No.: US 9,091,379 B2
(45) Date of Patent: Jul. 28, 2015

(54) INTERNAL CONNECTOR TUBE FOR USE WITH CONNECTING SLEEVE TO PROVIDE AIRTIGHT CONNECTION BETWEEN HOLLOW TUBES

(75) Inventors: James Baker, Ardee (IE); Sean Clarke, Ardee (IE)

(73) Assignee: Xerox Corporation, Norwalk, CT (US)

( * ) Notice: Subject to any disclaimer, the term of this patent is extended or adjusted under 35 U.S.C. 154(b) by 656 days.

(21) Appl. No.: 13/298,411

(22) Filed: Nov. 17, 2011

(65) Prior Publication Data
US 2013/0127153 A1 May 23, 2013

(51) Int. Cl.
F16L 21/00 (2006.01)
F16L 25/06 (2006.01)
F16L 25/12 (2006.01)

(52) U.S. Cl.
CPC ............ *F16L 25/065* (2013.01); *F16L 25/12* (2013.01)

(58) Field of Classification Search
CPC ............................. F16L 25/12; F16L 25/065
USPC ........ 285/145.1, 148.1, 145.4, 144.1, 148.25, 285/302, 298, 303, 397, 398, 417
See application file for complete search history.

(56) References Cited

U.S. PATENT DOCUMENTS

| | | | | |
|---|---|---|---|---|
| 1,570,155 A * | 1/1926 | Karbowski | | 285/328 |
| 1,589,781 A * | 6/1926 | Anderson | | 285/330 |
| 2,953,118 A | 9/1960 | Flick et al. | | |
| 2,964,015 A | 12/1960 | Garey | | |
| 3,454,291 A * | 7/1969 | Eidelberg et al. | | 285/371 |
| 3,741,441 A | 6/1973 | Eberle | | |
| 3,817,272 A * | 6/1974 | Finger | | 137/334 |
| 3,856,274 A | 12/1974 | Stevenson | | |
| 4,242,887 A | 1/1981 | Payne | | |
| 4,524,484 A * | 6/1985 | Graham | | 16/429 |
| 4,645,245 A | 2/1987 | Cunningham | | |
| 4,652,024 A * | 3/1987 | Krohn | | 285/111 |
| 4,737,284 A * | 4/1988 | Hauke et al. | | 210/198.2 |
| 4,901,014 A | 2/1990 | Riegger et al. | | |
| 5,083,586 A | 1/1992 | Akamatsu | | |
| 5,160,229 A | 11/1992 | Yoshino | | |
| 5,608,157 A | 3/1997 | Orr et al. | | |
| 6,032,004 A | 2/2000 | Mirabella, Jr. et al. | | |
| 6,877,925 B2 | 4/2005 | Fernandez | | |
| 7,654,472 B2 | 2/2010 | Nolte et al. | | |
| 7,677,607 B2 * | 3/2010 | Densel | | 285/298 |
| 7,793,994 B2 * | 9/2010 | Boyd | | 285/354 |
| 2007/0074970 A1 | 4/2007 | Purdy, II et al. | | |
| 2009/0110813 A1 * | 4/2009 | Zimmerman et al. | | 427/137 |

OTHER PUBLICATIONS

Definition of the term "wand", accessed Sep. 27, 2014, http://www.merriam-webster.com/dictionary/wand.*

* cited by examiner

*Primary Examiner* — Michael P Ferguson
*Assistant Examiner* — Jay R Ripley
(74) *Attorney, Agent, or Firm* — Gibb & Riley, LLC (57) ABSTRACT

A connecting structure connects a hollow first tube and a hollow second tube. The second tube comprises internal screw threads. The connecting structure further includes a hollow connecting sleeve connecting the first tube to the second tube. Portions of the first tube and the second tube are positioned within the connecting sleeve. The first tube is movable within the connecting sleeve in a direction parallel to an internal surface of the first tube. The connecting structure further includes a hollow connecting tube connected to an internal surface of the second tube and positioned within the first tube. The connecting tube comprises a first end having external screw threads engaged with the internal screw threads of the second tube. At least one O-ring is located on an external portion of a second end of the connecting tube, opposite the first end.

16 Claims, 8 Drawing Sheets

INTERNAL CONNECTOR TUBE FOR USE WITH CONNECTING SLEEVE TO PROVIDE AIRTIGHT CONNECTION BETWEEN HOLLOW TUBES

BACKGROUND

Embodiments herein generally relate to connectors that connect hollow tubes together, and more particularly, to a connector that utilizes an external sleeve and an internal connecting tube to provide an airtight connection between the tubes being joined.

Sometimes it is necessary to connect hollow tubes to one another. Such connections can be made airtight and watertight using a number of conventional processes and structures. For example, the tubes can be threaded and screwed together, one can be fitted within the other tube and the two can be soldered together, or an external sleeve can be positioned over the tubes and soldered in place. However, some conventional connections can require that the tubes be in a permanently fixed position with respect to each other and, therefore, such conventional connections are not useful in situations where the tubes need to move relative to each other.

SUMMARY

An exemplary connecting structure may connect a hollow first tube and a hollow second tube. The second tube comprises internal screw threads. The apparatus further includes a hollow connecting sleeve connecting the first tube to the second tube. Portions of the first tube and the second tube are positioned within the connecting sleeve. The first tube is movable within the connecting sleeve in a direction parallel to an internal surface of the first tube. The apparatus further includes a hollow connecting tube connected to an internal surface of the second tube and positioned within the first tube. The connecting tube comprises a first end having external screw threads engaged with the internal screw threads of the second tube. At least one O-ring is located on an external portion of a second end of the connecting tube, opposite the first end. The second end of the connecting tube is positioned within the first tube such that the O-ring contacts an internal surface of the first tube, and the O-ring seals a gap between the external portion of the connecting tube and the internal surface of the first tube.

In addition, at least one annular groove is in the external portion of the connecting tube, at the second end of the connecting tube, and the O-ring is positioned within the annular groove. The connecting tube is fixedly connected to the second tube. An adjustable fastener is connected to the connecting sleeve and the first tube. The adjustable fastener temporarily maintains the first tube in a fixed position relative to the connecting sleeve. The adjustable fastener comprises a threaded member threaded through the connecting sleeve and biased against an outer surface of the first tube. The first tube, the connecting tube, the O-ring, and the second tube form a continuous, airtight, sealed passage.

A more specific apparatus herein comprises a hollow supply tube and a hollow hub connected to the supply tube. The hub comprises internal screw threads. A hollow connecting sleeve connects the supply tube to the hub. Portions of the supply tube and the hub are positioned within the connecting sleeve, and the supply tube is movable within the connecting sleeve in a direction parallel to an internal surface of the supply tube. A hollow connecting tube is connected to an internal surface of the hub and positioned within the supply tube. The connecting tube comprises a first end having external screw threads engaged with the internal screw threads of the hub. Additionally, at least one O-ring is located on an external portion of a second end of the connecting tube, opposite the first end. The second end of the connecting tube is positioned within the supply tube such that the O-ring contacts an internal surface of the supply tube, and the O-ring seals a gap between the external portion of the connecting tube and the internal surface of the supply tube. A hollow application wand is also connected to the hub. The supply tube, the connecting tube, the O-ring, and the hub form a continuous, airtight, sealed passage.

At least one annular groove is in the external portion of the connecting tube at the second end of the connecting tube, and the O-ring is positioned within the annular groove. The connecting sleeve and the application wand are fixedly connected to the hub. An adjustable fastener is connected to the connecting sleeve and the supply tube. The adjustable fastener temporarily maintains the supply tube in a fixed position relative to the connecting sleeve.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, some conventional connections require that connected tubes be in a permanently fixed position with respect to each other and, therefore, such conventional connections are not useful in situations where the tubes need to move relative to each other. Therefore, the embodiments herein provide a connection structure that uses an outer sleeve in combination with an inner connection tube, where the inner connection tube fits within the tubes being connected. Further, the inner connection tube is threaded on one end (so that it can be screwed into one of the tubes) and has one or more O-rings on the other end (so that it forms an airtight seal with the inner surface of the other tube).

As would be understood by those ordinarily skilled in the art, the term "tube" used herein can represent any elongated hollow structure such as a pipe, hose, conduit, etc., that is capable of maintaining a gas or liquid material. Further, all the structures mentioned herein can be formed from any material which is conventionally known or developed in the future (which will vary depending upon specific implementation). Therefore, structures herein can be formed from metals, alloys, plastics, ceramics, fibrous material, rubbers, etc. Further, the materials selected can be flexible or rigid, again depending upon specific implementation. Therefore, the structure that is defined in the claims is not limited to any size, specific material, or any specific rigidity, so long as the materials function as described herein.

Figure 1:
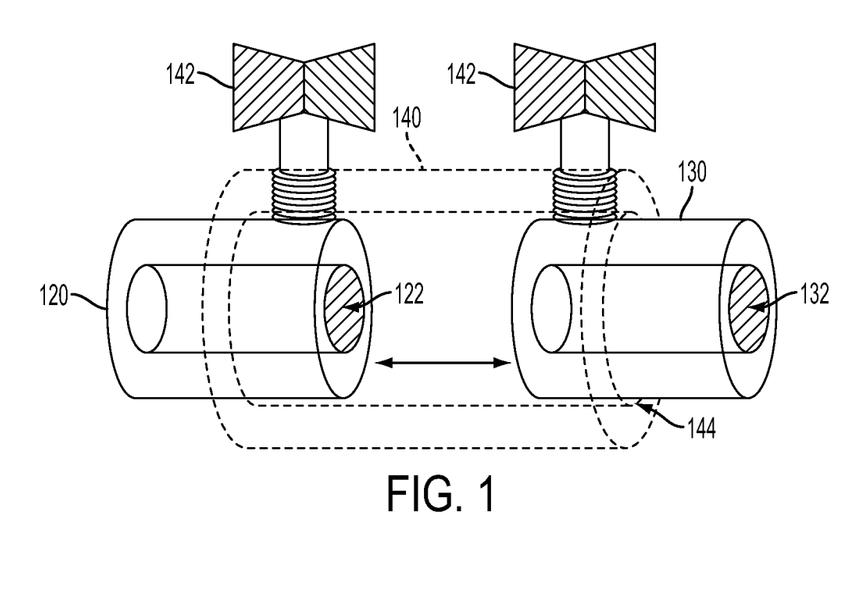
FIG. 1 is a perspective-view schematic diagram of a tube connection device.

For example, as shown in FIG. 1, a connecting structure may connect a hollow first tube 120 and a hollow second tube 130. Areas 122 and 132 of tubes 120 and 130 represent the hollow sections of the tubes. The drawings do not illustrate the full length of the tubes 120, 130 in order to more fully illustrate the features of the embodiments herein. The apparatus includes a hollow connecting sleeve 140 connecting the first tube 120 to the second tube 130. As shown in FIG. 1, the sleeve 140 fits over the outer surfaces of the tubes 120, 130 such that only portions of the first tube 120 and the second tube 130 are positioned within the connecting sleeve 140.

Adjustable fasteners 142 are connected to the connecting sleeve 140 and the first tube 120. For example, the fasteners 142 could comprise threaded bolts, threaded wing nuts, or any other similar adjustable structure. The adjustable fastener 142 temporarily maintains the first tube 120 in a fixed position relative to the connecting sleeve 140 and allows the relative positions of the tubes 120, 130 to be adjusted. The adjustable fastener 142 comprises a threaded member threaded through threads within the connecting sleeve 140. The adjustable fasteners 142 are biased against the outer surfaces of the tubes 120, 130 when the fasteners 142 are screwed down tightly against the outer surfaces of the tubes 120, 130.

The tubes 120, 130 are movable within the connecting sleeve 140 in a direction parallel to an internal surface of the first tube 120 as shown by the double arrow in the drawings. Therefore, for example, one or both of the fasteners 142 can be loosened and the tubes 120, 130 can be moved toward each other or away from each other within the sleeve 140, after which one or more of the fasteners 142 can be re-tightened. While this structure allows for an adjustable connection, it also presents the possibility that leaks can occur through gaps 144 between the sleeve 140 and the outer surfaces of the tubes 120, 130.

Figure 2:
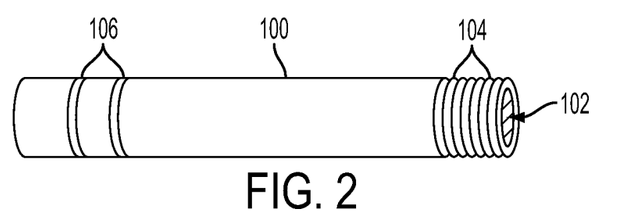
FIG. 2 is a perspective-view schematic diagram of a tube connection device according to embodiments herein.

In view of the issue that leaks can occur through the gaps 144, a hollow connecting tube 100 is provided (FIG. 2). Area 102 represents the hollow section of the connecting tube 100. One end of the connecting tube 100 (which is, for convenience, referred to as the first end) is formed or machined to include threads 104. Further, at least one annular groove 106 is formed or machined in the external portion at the opposite end (which is, for convenience, referred to as the second end) of the connecting tube 100.

Figure 3:
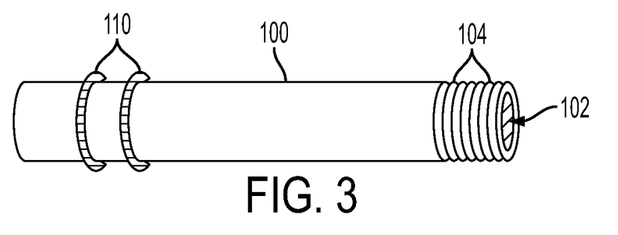
FIG. 3 is a perspective-view schematic diagram of a tube connection device according to embodiments herein.

As shown in FIG. 3, one or more O-rings 110 are positioned within the annular grooves 106. Therefore, at least one O-ring 110 is located on the external portion of the second end of the connecting tube 100, opposite the first end. As would be understood by those ordinarily skilled in the art, while only two O-rings are illustrated in the drawings, many more O-rings could be utilized, or a single O-ring could be utilized.

Figure 4:
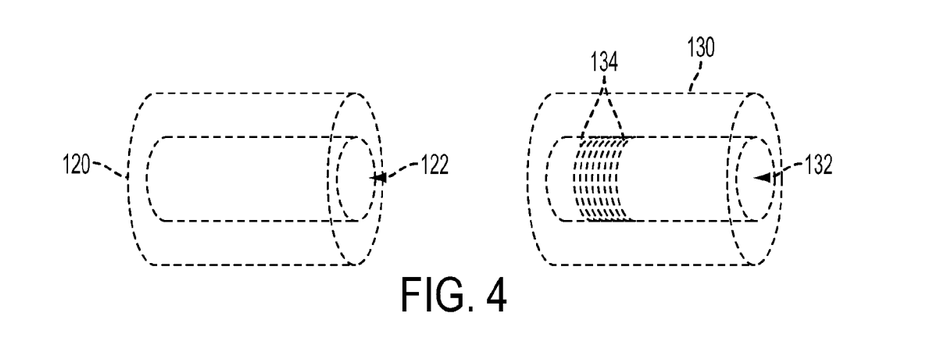
FIG. 4 is a perspective-view schematic diagram of a tube device.
Figure 5:
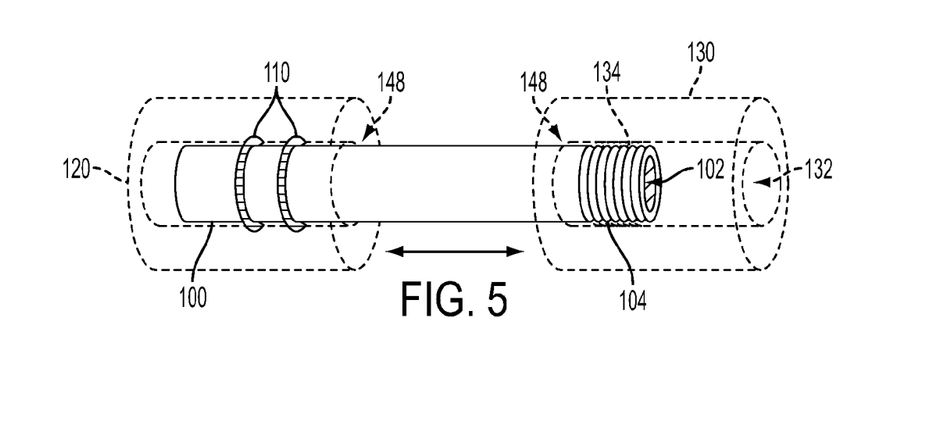
FIG. 5 is a perspective-view schematic diagram of a tube connection device according to embodiments herein.
Figure 6:
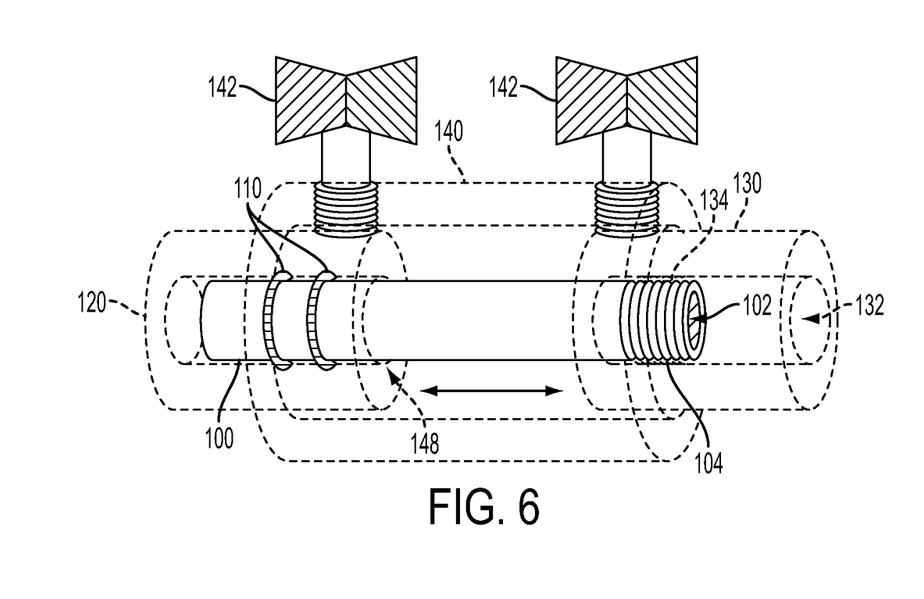
FIG. 6 is a perspective-view schematic diagram of a tube connection device according to embodiments herein.

In FIGS. 4-6, the tubes 120, 130 are shown in transparent view to allow the connecting tube 100 and its features to be viewed more easily. As shown in FIG. 4, screw threads 134 are machined or formed on the internal surface of one of the tubes (which in this case has been arbitrarily selected as tube 130). These internal screw threads 134 match the screw threads 104 that are formed on the exterior portion of the connecting to 100.

As shown in FIG. 5, the connecting tube 100 is connected to the internal surfaces of the second tube 130 and positioned within the first tube 120. Stated more specifically, the first end of the connecting tube 100 has external screw threads 104 engaged with the internal screw threads 134 of the second tube 130. If desired, any readily available sealing material, such as plumbers tape, liquid gasket material, bonding material, etc., can be used to seal the threads 104, 134 together.

The second end of the connecting tube 100 is positioned within the first tube 120 such that the O-ring 110 contacts the internal surface of the first tube 120. Therefore, the connecting tube 100 is fixedly connected to the second tube 130 and is slideably connected to the first tube 130.

The screw threads 104, 134 and the O-ring 110 seal the gaps 148 between the external portion of the connecting tube 100 and the internal surface of the first tube 120. Therefore, the first tube 120, the connecting tube 100, the O-ring 110, the second tube 130, and the threads 104, 134 form a continuous, airtight, watertight, sealed passage.

With the structure shown in FIG. 5, the tubes 120, 130 are movable relative to each other (as indicated by the double arrow). In order to maintain the tubes 120, 130 in a fixed position relative to each other, as shown in FIG. 6, the sleeve 140 is connected to the tubes 120, 130 using the fasteners 142, as discussed above. Further, the fasteners 142 could be on opposite sides for balance when the shaft is turning as discussed below (although only one fastener 142 could be used, or more than two could be used, depending upon specific implementation). Therefore, with the structure illustrated in FIG. 6, the relative positions between the tubes 120, 130 can be adjusted (using fasteners 142) while still maintaining a continuous, airtight, sealed passage between the hollow portions 122, 132 of the tubes 120, 130 (as limited by the length of the connecting tube 100).

Figure 7:
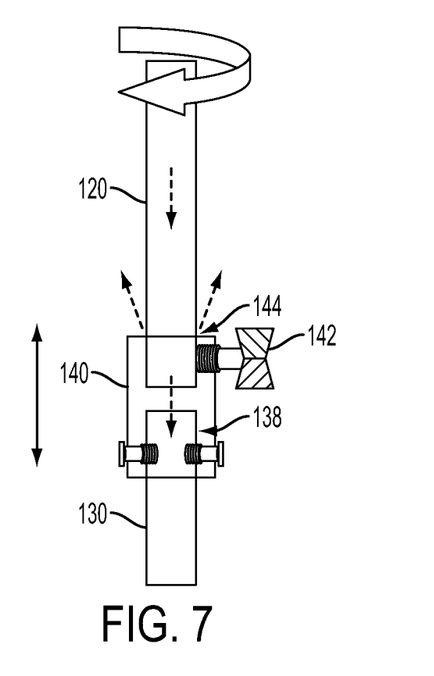
FIG. 7 is a cross-sectional view schematic diagram of a tube connection device.
Figure 8:
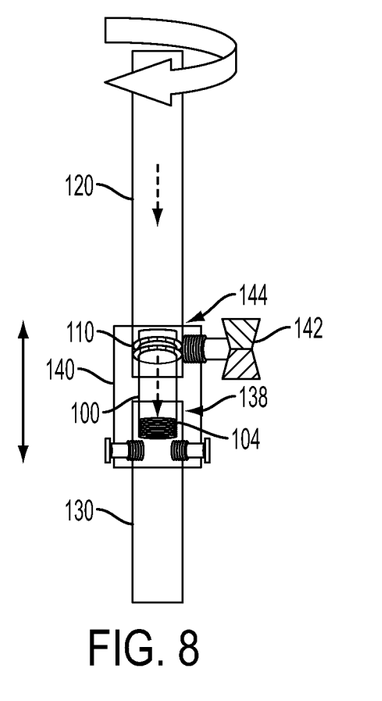
FIG. 8 is a cross-sectional view schematic diagram of a tube connection device according to embodiments herein.

These structures are similarly shown in FIGS. 7 and 8 in cross-sectional view, with airflow or fluid flow shown using dashed arrows. More specifically, without the connecting tube 100 structure, various gaps 144 cause air or fluid to leak between the sleeve 140 and the tubes 120, 130. To the contrary, as shown in FIG. 8, with the connecting tube 100 in place, because first tube 120, the connecting tube 100, the O-ring 110, the second tube 130, and the threads 104, 134 form a continuous, airtight, watertight, sealed passage, no gas or fluid leaks from the gaps 144.

Note that FIGS. 7 and 8 also illustrate some optional features including the ability to rotate the entire structure as a single unit (shown by curved arrow) and that the sleeve 140 can be permanently attached one of the tubes (tube 130 in this example) using, for example, bolts. However, the relative position of the tubes 120, 130 can still be adjusted by operation of the fastener 142 used to connect the sleeve 140 to the first tube 120. Further, gasket material 138 (or various sealing material, such as plumbers tape, liquid gasket material, bonding material, etc.) can be used to help seal the sleeve 140 to other structures.

Figure 9:
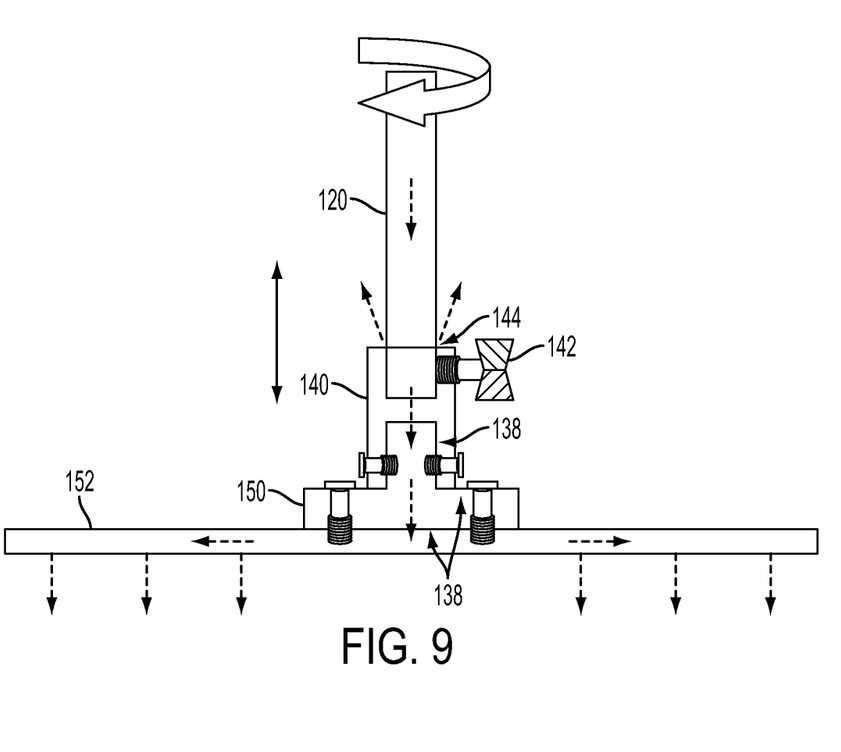
FIG. 9 is a cross-sectional view schematic diagram of a tube connection device.
Figure 10:
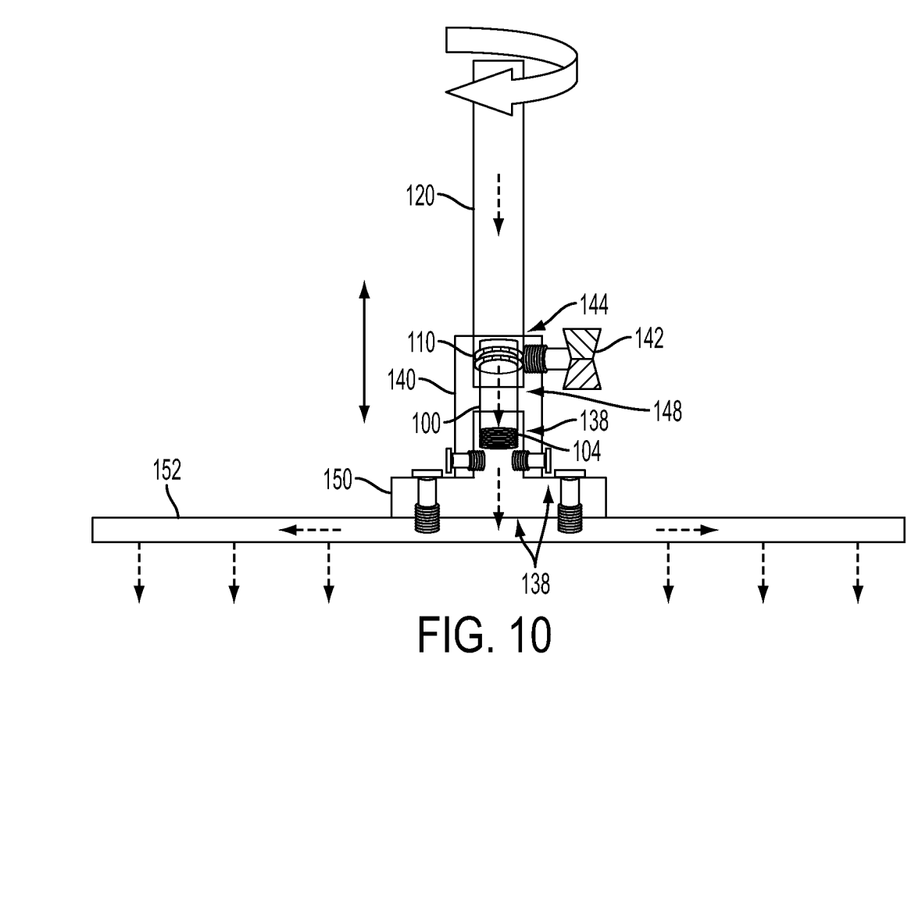
FIG. 10 is a cross-sectional view schematic diagram of a tube connection device according to embodiments herein.

A more specific apparatus is illustrated in FIGS. 9 and 10. This apparatus includes a hollow supply tube 120 and a hollow hub 150 connected to the supply tube 120. Without the connecting tube 100 structure, various gaps 144 in the structure shown in FIG. 9 cause air or fluid to leak between the sleeve 140 and the supply tube 120. To the contrary, as shown in FIG. 10, with the connecting tube 100 in place, because the supply tube 120, the connecting tube 100, the O-ring 110, the hub 150, and the threads 104, 134 form a continuous, airtight, watertight, sealed passage, no gas or fluid leaks from the gaps 144.

In FIGS. 9 and 10, the hub 150 comprises internal screw threads 134 similar to those discussed above. The hollow connecting sleeve 140 physically connects the supply tube 120 to the hub 150. Again, portions of the supply tube 120 and the hub 150 are positioned within the connecting sleeve 140, and the supply tube 120 is movable within the connecting sleeve 140 in a direction parallel to an internal surface of the supply tube 120 (toward and away from the hub 150).

As was discussed above, the hollow connecting tube 100 is connected to the internal surface of the hub 150 and is positioned within the supply tube 120. The first end of the connecting tube 100 has external screw threads 104 engaged with the internal screw threads 134 of the hub 150. Additionally, at least one O-ring 110 is located on an external portion of a second end of the connecting tube 100, opposite the first end. The second end of the connecting tube 100 is positioned within the supply tube 120 such that the O-ring 110 contacts the internal surface of the supply tube 120, and the O-ring 110 seals a gap 148 between the external portion of the connecting tube 100 and the internal surface of the supply tube 120.

A hollow application wand 152 is also connected to the hub 150. The connecting sleeve 140 and the application wand 152 are fixedly connected to the hub 150 (using, for example, bolts). An adjustable fastener 142 is connected to the connecting sleeve 140 and the supply tube 120. The adjustable fastener 142 temporarily maintains the supply tube 120 in a fixed position relative to the connecting sleeve 140.

While the wand 152 and hub 150 are shown as separate elements bolted together (and sealed with gasket material 138) such structures could comprise a single combined structure (or could be divided into more different structures). The wand 152 includes outlets that dispense the gas or air being supplied by the supply tube 120. Rotation of the supply tube 120 rotates the wand 152 because such items are physically connected to each other by the hub 150 and sleeve 140. Further, the fastener 142 can be used to adjust the position of the wand 152 and hub 150 relative to the supply tube 120, without disturbing the continuous, airtight, watertight, sealed passage created by the supply tube 120, the connecting tube 100, the O-ring 110, the hub 150, and the threads 104, 134.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. An apparatus comprising:
    a hollow connecting sleeve connecting a hollow first tube to a hollow second tube, said hollow connecting sleeve having an internal surface that extends from a first hollow sleeve terminal end to a second hollow sleeve terminal end, all of said internal surface of said hollow connecting sleeve being free of threads and being a single right circular cylindrical surface, portions of said first tube and said second tube being positioned within said hollow connecting sleeve along said internal surface of said hollow connecting sleeve, said first tube having a first tube terminal end positioned within said hollow connecting sleeve, said second tube having a second tube terminal end positioned within said hollow connecting sleeve, said first tube being movable within a first gap between said first tube and said internal surface of said hollow connecting sleeve, said first gap extending from said first hollow sleeve terminal end to said first tube terminal end, said second tube being movable within a second gap between said second tube and said internal surface of said hollow connecting sleeve, said second gap extending from said second hollow sleeve terminal end to said second tube terminal end, all of said internal surface of said hollow connecting sleeve being free of threads allowing said first tube and said second tube to be slidable within said hollow connecting sleeve in a linear direction parallel to said internal surface of said hollow connecting sleeve to adjust a position of said first tube relative to said second tube, said second tube comprising internal screw threads, and said first gap and said second gap allowing unobstructive air and fluid leaks;
    a hollow connecting tube connected to an internal surface of said second tube and positioned within said first tube, said hollow connecting tube comprising a first end having external screw threads engaged with said internal screw threads of said second tube;
    an O-ring located on an external portion of a second end of said hollow connecting tube opposite said first end, said second end of said hollow connecting tube being positioned within said first tube such that said O-ring contacts an internal surface of said first tube, said O-ring sealing a third gap between said external portion of said hollow connecting tube and said internal surface of said first tube, and said first tube, said hollow connecting tube, said O-ring, and said second tube forming a continuous, airtight, sealed passage; and
    adjustable fasteners extending through said hollow connecting sleeve to exterior surfaces of said first tube and said second tube, said adjustable fasteners temporarily maintaining said first tube and said second tube in fixed positions relative to said hollow connecting sleeve after said position of said first tube relative to said second tube has been adjusted.

2. The apparatus according to claim 1, said hollow connecting tube being fixedly connected to said second tube.

3. The apparatus according to claim 1, said adjustable fasteners comprising a threaded member threaded through said hollow connecting sleeve and biased against an outer surface of said first tube.

4. The apparatus according to claim 1, further comprising at least one annular groove in said external portion of said hollow connecting tube at said second end of said hollow connecting tube.

5. The apparatus according to claim 4, said O-ring being positioned within said annular groove.

6. An apparatus comprising:
a hollow first tube;
a hollow second tube connected to said hollow first tube, said hollow second tube comprising internal screw threads;
a hollow connecting sleeve connecting said hollow first tube to said hollow second tube, said hollow connecting sleeve having an internal surface that extends from a first hollow sleeve terminal end to a second hollow sleeve terminal end, all of said internal surface of said hollow connecting sleeve being free of threads and being a single right circular cylindrical surface, portions of said first tube and said second tube being positioned within said hollow connecting sleeve along said internal surface of said hollow connecting sleeve, said first tube having a first tube terminal end positioned within said hollow connecting sleeve, said second tube having a second tube terminal end positioned within said hollow connecting sleeve, said first tube being movable within a first gap between said first tube and said internal surface of said hollow connecting sleeve, said first gap extending from said first hollow sleeve terminal end to said first tube terminal end, said second tube being movable within a second gap between said second tube and said internal surface of said hollow connecting sleeve, said second gap extending from said second hollow sleeve terminal end to said second tube terminal end, all of said internal surface of said hollow connecting sleeve being free of threads allowing said first tube and said second tube to be slidable within said hollow connecting sleeve in a linear direction parallel to said internal surface of said hollow connecting sleeve to adjust a position of said first tube relative to said second tube, said second tube comprising internal screw threads, and said first gap and said second gap allowing unobstructive air and fluid leaks;
a hollow connecting tube connected to an internal surface of said second tube and positioned within said first tube, said hollow connecting tube comprising a first end having external screw threads engaged with said internal screw threads of said second tube;
an O-ring located on an external portion of a second end of said hollow connecting tube opposite said first end, said second end of said hollow connecting tube being positioned within said first tube such that said O-ring contacts an internal surface of said first tube, said O-ring sealing a third gap between said external portion of said hollow connecting tube and said internal surface of said first tube, and said first tube, said hollow connecting tube, said O-ring, and said second tube forming a continuous, airtight, sealed passage; and
adjustable fasteners extending through said hollow connecting sleeve to exterior surfaces of said first tube and said second tube, said adjustable fasteners temporarily maintaining said first tube and said second tube in fixed positions relative to said hollow connecting sleeve after said position of said first tube relative to said second tube has been adjusted.

7. The apparatus according to claim 6, said hollow connecting tube being fixedly connected to said second tube.

8. The apparatus according to claim 6, said adjustable fasteners comprising a threaded member threaded through said hollow connecting sleeve and biased against an outer surface of said first tube.

9. The apparatus according to claim 6, further comprising at least one annular groove in said external portion of said hollow connecting tube at said second end of said hollow connecting tube.

10. The apparatus according to claim 9, said O-ring being positioned within said annular groove.

11. An apparatus comprising:
a hollow supply tube;
a hollow hub connected to said supply tube, said hub comprising internal screw threads;
a hollow connecting sleeve connecting said supply tube to said hub, said hollow connecting sleeve having an internal surface that extends from a first hollow sleeve terminal end to a second hollow sleeve terminal end, all of said internal surface of said hollow connecting sleeve being free of threads and being a single right circular cylindrical surface, portions of said supply tube and said hub being positioned within said hollow connecting sleeve along said internal surface of said hollow connecting sleeve, said supply tube having a supply tube terminal end positioned within said hollow connecting sleeve, said hub having a hub terminal end positioned within said hollow connecting sleeve, said supply tube being movable within a first gap between said supply tube and said internal surface of said hollow connecting sleeve, said first gap extending from said first hollow sleeve terminal end to said supply tube terminal end, said hub being movable within a second gap between said hub and said internal surface of said hollow connecting sleeve, said second gap extending from said second hollow sleeve terminal end to said hub terminal end, all of said internal surface of said hollow connecting sleeve being free of threads allowing said supply tube and said hub to be slidable within said hollow connecting sleeve in a linear direction parallel to said internal surface of said hollow connecting sleeve to adjust a position of said supply tube relative to said hub, and said first gap and said second gap allowing unobstructive air and fluid leaks;
a hollow connecting tube connected to an internal surface of said hub and positioned within said supply tube, said hollow connecting tube comprising a first end having external screw threads engaged with said internal screw threads of said hub;
an O-ring located on an external portion of a second end of said hollow connecting tube opposite said first end, said second end of said hollow connecting tube being positioned within said supply tube such that said O-ring contacts an internal surface of said supply tube, said O-rings sealing a third gap between said external portion of said hollow connecting tube and said internal surface of said supply tube, and said supply tube, said hollow connecting tube, said O-ring, and said hub forming a continuous, airtight, sealed passage;
a hollow application wand connected to said hub; and
adjustable fasteners extending through said hollow connecting sleeve to exterior surfaces of said supply tube and said hub, said adjustable fasteners temporarily maintaining said supply tube and said hub in fixed positions relative to said hollow connecting sleeve after said position of said supply tube relative to said hub has been adjusted.

12. The apparatus according to claim 11, said hollow connecting sleeve being fixedly connected to said hub.

13. The apparatus according to claim 11, said application wand being fixedly connected to said hub.

14. The apparatus according to claim 1, said hollow connecting sleeve, said first tube, and said second tube being free of threads along said first gap and said second gap.

15. The apparatus according to claim 11, further comprising at least one annular groove in said external portion of said hollow connecting tube at said second end of said hollow connecting tube.

16. The apparatus according to claim 15, said O-ring being positioned within said annular groove.

* * * * *